United States Patent [19]

Keogh

[11] Patent Number: 5,047,476

[45] Date of Patent: Sep. 10, 1991

[54] PROCESS FOR CROSSLINKING HYDROLYZABLE COPOLYMERS

[75] Inventor: Michael J. Keogh, Bridgewater, N.J.

[73] Assignee: Union Carbide Chemicals and Plastics Company Inc., Danbury, Conn.

[21] Appl. No.: 351,073

[22] Filed: May 12, 1989

[51] Int. Cl.$^5$ ................................................. C08F 8/00
[52] U.S. Cl. ................................ 525/106; 525/105; 525/474; 526/279
[58] Field of Search ....................... 525/106, 105, 474; 526/279

[56] References Cited

U.S. PATENT DOCUMENTS 4,753,992  6/1988  Umpleby .......................... 525/330.2

Primary Examiner—Melvyn I. Marquis
Attorney, Agent, or Firm—Saul R. Bresch

[57] ABSTRACT

A process for crosslinking comprising the following steps:
(a) admixing, in a processing zone, a copolymer containing at least one hydrolyzable silane moiety; a dihydrocarbyltin oxide; and
  (i) a carboxylic acid;
  (ii) a compound bearing at least one carboxylate moiety, which is capable of forming a carboxylic acid when subjected to heat and/or moisture; or
  (iii) mixtures thereof, with the proviso that:
    (A) in the event that component (ii) is present, the conditions in the processing zone are such that the carboxylate moiety forms a carboxylic acid;
    (B) the residence time of the mixture in the processing zone is sufficient to at least partially complete the processing of the copolymer, but of sufficient brevity to substantially avoid a reaction of the carboxylic acid with the dihydrocarbyltin oxide; and
(b) passing the mixture from step (a) into a crosslinking zone under such reaction conditions that the carboxylic acid reacts with the dihydrocarbyltin oxide to form dihydrocarbyltin carboxylate, said crosslinking zone having a moisture content sufficient to crosslink the hydrolyzable copolymer in the presence of the dihydrocarbyltin carboxylate.

24 Claims, No Drawings

PROCESS FOR CROSSLINKING HYDROLYZABLE COPOLYMERS

TECHNICAL FIELD

This invention relates to a process for crosslinking hydrolyzable copolymers using a silanol condensation catalyst prepared in situ, and compositions therefor.

BACKGROUND ART

Scorch, i.e., premature crosslinking, in water curable resin systems is a widely recognized problem. It can result in numerous ways. The most difficult to control can be referred to as process scorch, which takes place in the presence of a silanol condensation catalyst. Process scorch is manifested just after the addition of the silanol condensation catalyst to the resin and, again, during the continuous processing of the water curable resin in, for example, an extruder. The former occurs with a rapid build up in viscosity and, in many cases, can be dramatic. The latter, generally, involves a more subtle build up of viscosity over time. In both cases, the extrusion is rendered difficult and ultimately results in an unacceptable extrudate and a shutdown of the operation.

The art is constantly searching for processes and compositions which lead to a diminution or elimination of process scorch.

DISCLOSURE OF THE INVENTION

An object of this invention, therefore, is to provide a crosslinking process which solves the problem of process scorch and a composition useful in the process.

Other objects and advantages will become apparent hereinafter.

According to the present invention the above object is met by a process for crosslinking comprising the following steps:

(a) admixing, in a processing zone, a copolymer containing at least one hydrolyzable silane moiety; a dihydrocarbyltin oxide; and
  (i) a carboxylic acid;
  (ii) a compound bearing at least one carboxylate moiety, which is capable of forming a carboxylic acid when subjected to heat and/or moisture; or
  (iii) mixtures thereof, with the proviso that:
    (A) in the event that component (ii) is present, the conditions in the processing zone are such that the carboxylate moiety forms a carboxylic acid;
    (B) the residence time of the mixture in the processing zone is sufficient to at least partially complete the processing of the copolymer, but of sufficient brevity to substantially avoid a reaction of the carboxylic acid with the dihydrocarbyltin oxide; and
(b) passing the mixture from step (a) into a crosslinking zone under such reaction conditions that the carboxylic acid reacts with the dihydrocarbyltin oxide to form dihydrocarbyltin carboxylate, said crosslinking zone having a moisture content sufficient to crosslink the hydrolyzable copolymer in the presence of the dihydrocarbyltin carboxylate.

DETAILED DESCRIPTION

The hydrolyzable resins useful in subject process derive their hydrolyzability from silane modification. They are commercially attractive because they can be simply and effectively cured with water. These copolymers are, therefore, susceptible to a broad range of processing conditions and are particularly useful in the preparation of extruded wire coatings, foams, pipe, and pond liners.

The curing or crosslinking of these silane modified copolymers is effected by exposing the copolymers to moisture. Without a silane condensation catalyst, however, moisture cure is exceedingly slow and, in the short time it takes to pass the resin through, e.g., an extruder, the amount of crosslinking achieved is negligible.

It is understood that the term "copolymer" as used in this specification may include silane grafted olefin homopolymers and copolymers, and copolymers of one or more olefin monomers and an olefin silane monomer. The monomers on which the homopolymers and copolymers are based can be alpha-olefins or diolefins having 2 to 20 carbon atoms, particularly the lower alpha-olefins having 2 to 12 carbon atoms. Preferably, a major proportion, i.e., more than 50 percent by weight, of each copolymer is attributed to ethylene, propylene, or 1-butene. The silane monomer, which is either grafted or copolymerized, is unsaturated and has at least one hydrolyzable group. Various useful alkenyl alkoxy silanes are mentioned below.

In addition to the alpha-olefin, diolefin, and silane monomers, the balance of the copolymer can be based on one or more various olefin monomers having 2 to 20 carbon atoms. Examples of useful monomers are the vinyl esters, alkyl methacrylates, and alkyl acrylates. Examples of these compounds are 1 hexene, 4-methyl-1 pentene, 1-undecene, ethyl acrylate, vinyl acetate, methyl methacrylate, 1,4 hexadiene, ethylidenenorbornene, dicyclopentadiene, butyl acrylate, and methyl acrylate. Silane modified terpolymers such as ethylene/propylene/ethylidene norbornene rubbers are of particular interest.

Silane grafted copolymers can be prepared by the technique described below. In this copolymer, the portion attributed to the silane is present in an amount of about 0.1 percent to about 10 percent by weight based on the weight of the copolymer and is preferably incorporated into the copolymer in an amount of about 0.5 to about 4 percent by weight. The silane used to modify the copolymer can be, among others, a vinyl trialkoxy silane such as vinyl trimethoxy silane, vinyl triethoxy silane, or vinyl triisopropoxy silane. Generally speaking, any unsaturated monomeric organosilane having one or more hydrolyzable groups can be used. If slower water cure or better shelf stability is desired, vinyl triisobutyoxy silane, vinyl tributoxy silane, or vinyl tris-(2-ethyl hexoxy) silane can be used.

A free radical generator or catalyst is used in the preparation of the silane grafted copolymer. Among the most useful free radical generators are dicumyl peroxide, lauryl peroxide, azobisisobutyronitrile, benzoyl peroxide, tertiary butyl perbenzoate, di(tertiary-butyl) peroxide, cumene hydroperoxide, 2,5-dimethyl-2,5-di (t-butylperoxy) hexene, 2,5-dimethyl-2,5 di(t-butylperoxy)hexane, tertiary butyl hydroperoxide, and isopropyl percarbonate. The organic peroxides are preferred. About 0.001 to about 5 percent by weight of free radical generator based on the weight of the polymer or copolymer is used, preferably about 0.001 to about 0.5 percent by weight.

A typical technique for preparing a silane grafted polyethylene is as follows: the polyethylene used can be, for example, a low density polyethylene having a density of 0.90 and a melt index of 1.0. It can be made by the processes described in European Patent Applications 0 120 501 and 0 120 503, both published on Oct. 3, 1984, wherein ethylene is polymerized together with an alpha olefin comonomer having 3 to 8 carbon atoms, or by other conventional techniques. In the present application, low density polyethylenes are considered to include copolymers of ethylene and a minor proportion of alpha olefin. 100 parts of ethylene copolymer, 0.2 part of polymerized 1,3-dihydro-2,2,4-trimethylquinoline (an antioxidant), 0.1 part of dicumyl peroxide, and 4 parts of vinyl tris-(2-ethyl-hexoxy) silane are mixed in a laboratory Brabender mixer at a temperature in the range of about 80° C. to about 115° C., a temperature low enough to keep the dicumyl peroxide below its decomposition temperature. After mixing for five minutes, the temperature is raised to a temperature in the range of about 150° C. to about 220° C. The batch is then mixed for 5 to 10 minutes during which grafting of the silane to the polyethylene occurs. The antioxidant is used as a radical trap to control the amount of crosslinking. This technique can be repeated, for example by using 3 parts of vinyltriisobutoxysilane; 0.1 part dicumyl peroxide; and 0.1 part of the antioxidant, tetrakis [methylene(2-5 di tert-butyl-4-hydroxyhydrocinnamate] methane; initial mixing is in the range of 110° C. to 120° C.; grafting is for 5 minutes at 185° C.

A copolymer of ethylene and silane can be prepared by the process described in U.S. Pat. No. 3,225,018 issued on Dec. 21, 1965 or U.S. Pat. No. 4,574,133 issued on Mar. 4, 1986. The portion of the copolymer attributed to the silane is in the range of about 0.5 to about 10 percent by weight based on the weight of the copolymer and is preferably in the range of about 0.5 to about 4 percent by weight.

Various other processes for preparing silane grafted copolymers and numerous unsaturated silanes suitable for use in preparing these polymers and bearing hydrolyzable groups such as alkoxy, oxy aryl, oxyaliphatic, and halogen are mentioned in U.S. Pat. Nos. 3,075,948; 4,412,042; 4,413,066; and 4,593,071.

The dihydrocarbyltin oxide can have the formula:

$$R_2SnO$$

wherein R is an alkyl or aryl radical and R can be alike or different. The R radical can have 1 to 20 carbon atoms and preferably has 1 to 8 carbon atoms. Examples of the R radical are methyl, ethyl, propyl, n-butyl, isobutyl, pentyl, hexyl, phenyl, and octyl. Examples of dihydrocarbyltin oxides useful in subject invention are dimethyltin oxide, dibutyltin oxide, dioctyltin oxide, diphenyltin oxide, methylphenyltin oxide, and dibenzyltin oxide. These organotin oxides are, generally, high melting, dispersible powdered solids, which show little or no activity in the crosslinking of hydrolyzable silane resins.

The carboxylic acids can be aliphatic or aromatic carboxylic acids having 1 to 30 carbon atoms, preferably 1 to 12 carbon atoms, and can be unsubstituted or substituted provided that the substituent is inert to the materials and conditions in the processing and crosslinking zones. Examples of suitable carboxylic acids are acetic, formic, propionic, butyric, octanoic, benzoic, salicylic, citric, maleic, oleic, isostearic, succinic, phthalic, stearic, and lauric. The carboxylate moieties of these, and other carboxylic acids, are examples of the carboxylate moieties which can be included in the compounds referred to below. The carboxylic acids react with the dihydrocarbyltin oxide at temperatures in the range of about 20° C. to about 350° C. and preferably about 50° C. to about 150° C.

Compounds bearing carboxylate moieties which form carboxylic acid when subjected to heat and/or moisture can be exemplified by silane carboxylates, compounds or complexes formed by the combination of fillers and carboxylate moieties, organic acid anhydrides, and resins.

Silane carboxylates include those compounds having the formula:

$$R'-Si-(OCOR'')_3$$

wherein R' is hydrogen or an aliphatic or aromatic radical and R'' is an aliphatic or aromatic radical. The aliphatic or aromatic radical can have 1 to 30 carbon atoms and preferably has 1 to 12 carbon atoms. The radical can be alkyl, alkaryl, aryl, cycloaliphatic, or heterocyclic. Examples of suitable radicals are methyl, ethyl, propyl, n-butyl, isobutyl, pentyl, hexyl, octyl, lauryl, phenyl, and benzyl. The silicone carboxylates can be exemplified by methyl triacetoxy silane, butyl triacetoxy silane, vinyl triacetoxy silane, methyl tribenzoxy silane, butyl tribenzoxy silane, and vinyl tribenzoxy silane.

The carboxylate moiety can also be attached to the surface of a conventional filler, by reaction to form a compound, e.g., $Mg(OH)_2\cdot OCOR''$, or a complex, e.g., $Al(OH)_3\cdot HOCOR''$. In both cases, R'' is as described above. Another example of a useful filler is $Ca(OH)_2$.

The organic acid anhydrides can have 4 to 20 carbon atoms and preferably 4 to 10 carbon atoms. Examples of suitable anhydrides are maleic anhydride, itaconic anhydride, crotonic anhydride, benzoic anhydride, and phthalic anhydride.

Resins having carboxylate moieties are exemplified by ethylene/vinyl acetate copolymer, ethylene/ethyl acrylate copolymer, ethylene/methylacrylate/acrylic acid terpolymer, and ethylene/acrylic acid copolymer.

The reaction of the dihydrocarbyltin oxide with the carboxylate moiety to place the tin oxide in an activated state, i.e., to provide a silanol condensation catalyst, and the subsequent crosslinking of a hydrolyzable silane modified polymer in its presence, can be illustrated as follows:

$$R_2SnO + RCOOH \longrightarrow R_2Sn(OCOR)_2 + H_2O \quad (i)$$

$$\text{polymer backbone-Si(OR)}_3 + H_2O \xrightarrow{R_2Sn(OCOR)_2} \quad (ii)$$

$$\text{polymer backbone-SiOH} \xrightarrow{R_2Sn(OCOR)_2} \text{a crosslinked polymer}$$

The processing zone can be a conventional extruder, e.g., a single screw type. A typical extruder has a hopper at its upstream end and a die at its downstream end. The hopper feeds into a barrel, which contains a screw. At the downstream end, between the end of the screw and the die, is a screen pack and a breaker plate. The screw portion of the extruder is considered to be divided up into three sections, the feed section, the compression section, and the metering section, and two zones, the back heat zone and the front heat zone, the sections and zones running from upstream to downstream. If it has more than one barrel, the barrels are connected in series. The length to diameter ratio of each barrel is in the range of about 16:1 to about 30:1.

The processing zone can also be a conventional injection molding apparatus, or a rotomolding apparatus.

In the event that the compound bearing the carboxylate moiety is present, the conditions in the processing zone are such that the carboxylate moiety forms a free carboxylic acid. As noted, this is accomplished through the application of heat and/or moisture. The temperature in the processing zone will generally be in the range of about 20° C. to about 350° C. and is preferably in the range of about 50° C. to about 150° C. These are conventional extrusion and injection molding temperatures. In the case of ethylene/vinyl acetate copolymers, the heat will be sufficient to form the carboxylic acid. With respect to those compounds which need moisture to form the carboxylic acid, the formation is generally facilitated by the presence of heat in the ranges mentioned above.

The residence time of the mixture in the processing zone is, for example, of sufficient length to complete all or part of the extrusion or injection molding. This time is in the range of about 20 to about 2000 seconds and is preferably about 60 to about 1000 seconds. In view of this brief residence time, the reaction of the carboxylic acid with the dihydrocarbyltin oxide is substantially avoided, i.e., kept to a minimum.

The crosslinking zone is usually a water bath through which the extruded or injection molded resin, i.e, the processed resin, is passed. The crosslinking zone can be operated at a temperature in the range of about 20° C. to about 200° C. and is preferably operated at a temperature in the range of about 50° C. to about 90° C. The residence time in this zone can be in the range of about 0.01 to about 72 hours and is preferably about 1 to about 24 hours. As an alternative to the water bath, the zone can be humidified, the relative humidity being at least about 50 percent.

In the crosslinking zone, the carboxylic acid reacts with the dihydrocarbyltin oxide to provide the silanol condensation catalyst, which accelerates the moisture cure of the hydrolyzable resin.

Conventional additives can be added to the mixture introduced into the processing zone. The amount of additive is usually in the range of about 0.01 to about 50 percent based on the weight of the resin. Useful additives are antioxidants, ultraviolet absorbers, antistatic agents, pigments, dyes, fillers, slip agents, fire retardants, plasticizers, processing aids, lubricants, stabilizers, and smoke inhibitors. Blends of the hydrolyzable polymer and other polymers can be prepared in the processing zone provided that the resins to be blended with the hydrolyzable copolymer will not crosslink. Examples of these resins are low density polyethylene, high density polyethylene, polypropylene, linear low density polyethylene, and very low density polyethylene (equal to or less than 0.915 grams per cubic centimeter).

The patents and applications mentioned in this specification are incorporated by reference herein.

The invention is illustrated by the following examples:

EXAMPLES 1 TO 4

The addition copolymer of ethylene and vinyltrimethoxysilane is fluxed in a Brabender mixer at 130° C. and, in examples 2, 3 and 4, different masterbatches ar added and dispersed during 30 seconds. After discharge, rheometer plaques are pressed, placed in a water bath at 70° C., and rheometer readings are taken at various intervals.

The masterbatch added in Example 2 is made up of 90 percent by weight ethylene/ethyl acrylate copolymer and 10 percent by weight dibutyltin dilaurate.

The masterbatch added in Example 3 is made up of 92 percent by weight ethylene/ethyl acrylate copolymer and 8 percent by weight dibutyltin oxide.

The masterbatch added in example 4 is made up of 88.9 percent by weight ethylene/ethyl acrylate copolymer; 8 percent by weight dibutyltin oxide; and 3.1 percent by weight maleic anhydride.

The rheometer test procedure is described in U.S. Pat. No. 4,108,852 issued on Apr. 19, 1977. The rheometer reading is in pound-inches (lb.-in.).

The rheometer readings for the various time intervals are as follows:

| Time Interval (hours in 70° C. H$_2$O) | Example | | | |
|---|---|---|---|---|
| | 1 | 2 | 3 | 4 |
| 0 | 5 | 9 | 5 | 9 |
| 1 | — | 15 | 6 | 18 |
| 4 | — | 26 | 6 | 30 |
| 24 | — | 40 | 10 | 50 |
| 48 | 7 | 51 | 16 | 55 |
| 96 | 13 | — | 23 | — |
| 336 | 25 | — | 39 | — |

EXAMPLES 5 TO 9

The addition copolymer of ethylene and vinyltrimethoxysilane is fluxed in a Brabender mixer at 130° C., additives are added and mixed and dispersed during one minute. After discharge, rheometer plaques are pressed, placed in a water bath at 70° C., and rheometer readings are taken at zero and 16 hours. Components, proportions, and results are as follows:

| | Example | | | | |
|---|---|---|---|---|---|
| | 5 | 6 | 7 | 8 | 9 |
| | (parts by weight) | | | | |
| Components | | | | | |
| copolymer | 100 | 100 | 100 | 100 | 100 |
| dibutyltin oxide | 0.05 | — | — | 0.05 | 0.05 |
| stearic acid | — | 0.12 | — | 0.12 | — |
| ethyltriacetoxy silane | — | — | 0.03 | — | 0.03 |
| rheometer reading | | | | | |
| 0 hours | 5 | 7 | 7 | 8 | 8 |
| 16 hours | 7 | 12 | 8 | 16 | 14 |

I claim:
1. A process for crosslinking comprising the following steps:
(a) admixing, in a processing zone, a copolymer containing at least one hydrolyzable silane moiety; a dihydrocarbyltin oxide; and
(i) a carboxylic acid;
(ii) a compound bearing at least one carboxylate moiety, which is capable of forming a carboxylic acid when subjected to heat and/or moisture; or
(iii) mixtures thereof, with the proviso that:
(A) in the event that component (ii) is present, the conditions in the processing zone are such that the carboxylate moiety forms a carboxylic acid;

(B) the residence time of the mixture in the processing zone is sufficient to at least partially complete the processing of the copolymer, but of sufficient brevity to substantially avoid a reaction of the carboxylic acid with the dihydrocarbyltin oxide; and (b) passing the mixture from step (a) into a crosslinking zone under such reaction conditions that the carboxylic acid reacts with the dihydrocarbyltin oxide to form dihydrocarbyltin carboxylate, said crosslinking zone having a moisture content sufficient to crosslink the hydrolyzable copolymer in the presence of the dihydrocarbyltin carboxylate.

2. The process defined in claim 1 wherein the copolymer is obtained from one or more alpha-olefin comonomers and one or more alkenyl alkoxy silane comonomers.

3. The process defined in claim 2 wherein the copolymer is an ethylene/vinyl trimethoxy silane copolymer.

4. The process defined in claim 1 wherein the copolymer is a silane grafted homopolymer or copolymer or a copolymer of an olefin and a silane.

5. The process defined in claim 1 wherein the dihydrocarbyl tin oxide has the formula $R_2SnO$ wherein R is an alkyl or aryl radical and each R can be alike or different.

6. The process defined in claim 1 wherein a carboxylic acid is present.

7. The process defined in claim 1 wherein an organic acid anhydride is present.

8. The process defined in claim 1 wherein a compound having at least one carboxylate moiety, which is capable of forming a carboxylic acid when subjected to heat and/or moisture, is present.

9. The process defined in claim 1 wherein the residence time in the processing zone is in the range of about 20 to about 2000 seconds.

10. The process defined in claim 1 wherein the temperature in the processing zone is in the range of about 20° C. to about 350° C.

11. The process defined in claim 1 wherein the processing zone is an extrusion zone.

12. The process defined in claim 1 wherein the temperature in the crosslinking zone is in the range of about 20° C. to about 200° C.

13. The process defined in claim 1 wherein the compound has 1 to 30 carbon atoms.

14. The process defined in claim 1 wherein the compound of paragraph (a) (ii) is a homopolymer or copolymer bearing at least one carboxylate moiety.

15. A composition comprising a copolymer containing at least one hydrolyzable silane moiety; a dihydrocarbyltin oxide; and (i) a carboxylic acid, (ii) a compound bearing at least one carboxylate moiety, which is capable of forming a carboxylic acid when subjected to heat and/or moisture, or (iii) mixtures thereof.

16. The composition defined in claim 15 wherein the copolymer is obtained from one or more alpha-olefin comonomers and one or more alkenyl alkoxy silane comonomers.

17. The composition defined in claim 16 wherein the copolymer is an ethylene/vinyl trimethoxy silane copolymer.

18. The composition defined in claim 15 wherein the copolymer is a silane grafted homopolymer or copolymer or a copolymer of olefin and a silane.

19. The composition defined in claim 15 wherein the dihydrocarbyltin oxide has the formula $R_2SnO$ wherein R is an alkyl or aryl radical and each R can be alike or different.

20. The composition defined in claim 15 wherein a carboxylic acid is present.

21. The composition defined in claim 15 wherein an organic acid anhydride is present.

22. The composition defined in claim 15 wherein a compound bearing at least one carboxylate moiety, which is capable of forming a carboxylic acid when subjected to heat and/or moisture, is present.

23. The composition defined in claim 15 wherein the compound has 1 to 30 carbon atoms.

24. The composition defined in claim 15 wherein the compound of item (ii) is a homopolymer or copolymer bearing at least one carboxylate moiety.

* * * * *